Figure 3:
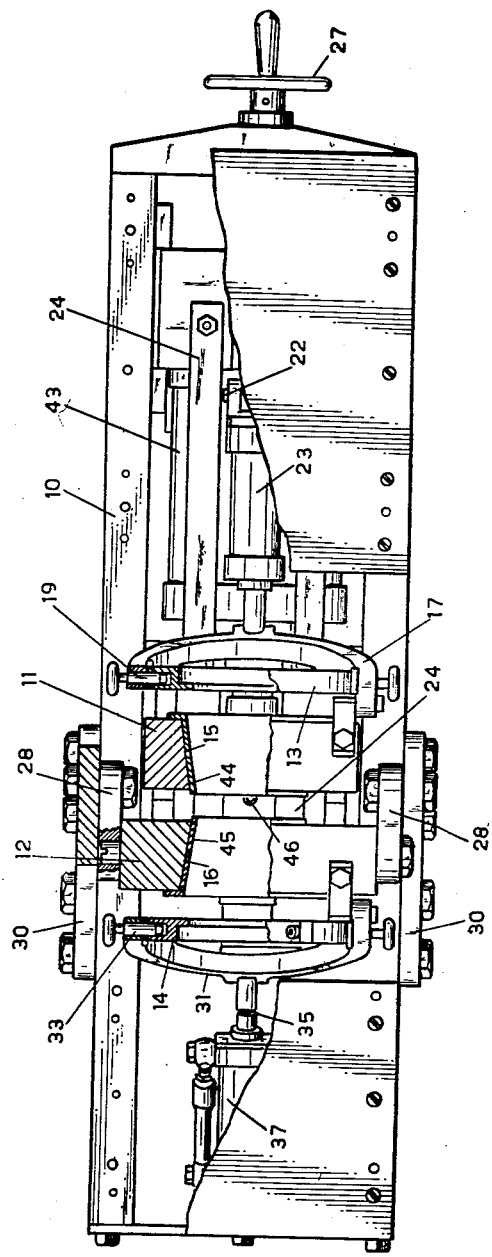

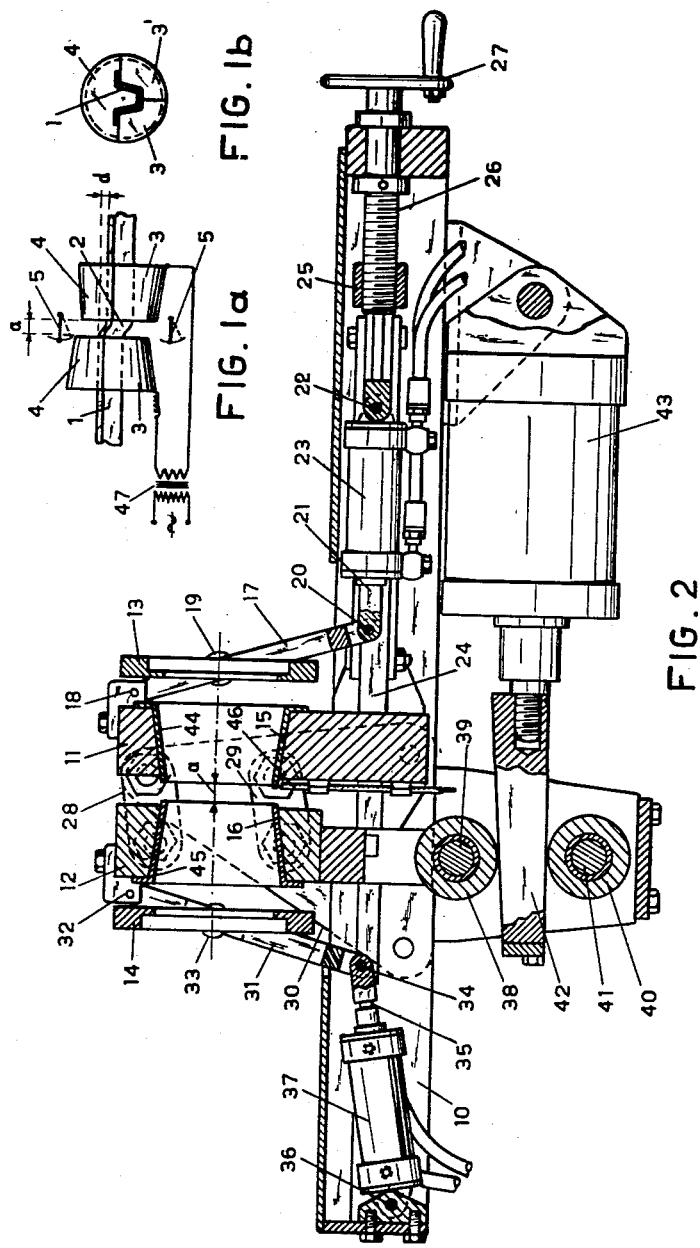

Sept. 19, 1961     D. J. B. ARIS     3,000,423
MACHINE FOR JOGGLING SHAPED METAL OR METAL PROFILES
Filed Aug. 13, 1958     2 Sheets-Sheet 2

United States Patent Office 3,000,423
Patented Sept. 19, 1961

3,000,423
MACHINE FOR JOGGLING SHAPED METAL OR METAL PROFILES
David J. B. Aris, Amsterdam, Netherlands, assignor to N.V. Koninklijke Nederlandse Vliegtuigenfabriek Fokker, Amsterdam, Netherlands
Filed Aug. 13, 1958, Ser. No. 754,896
Claims priority, application Netherlands Aug. 19, 1957
5 Claims. (Cl. 153—11)

The invention relates to joggle machines, and more particularly to machines for joggling shaped metal or metal profiles.

When metal profiles are joggled, a deformation of the profile is brought about in such a manner that between two longitudinally juxtaposed sections a parallel displacement of one section with respect to the other section is effected. Such a deformation of profiles is often applied in the construction of aeroplanes and in shipbuilding for compensating differences in thickness of the shell or frame plates at the riveted joints and the like by joists, stiffening profiles and the like. Prior hereto, the joggling has, as a rule, been effected by means of a press or a stamp bringing about the desired parallel displacement of the one profile section with respect to the other. The joggled portion obtained in this way, however, does not retain in every respect the same favourable form. A local damaging of the profile, combined with a decrease in strength, may readily occur. A deformation is also often caused, whereby the moment of inertia of the profile at the spot where the joggling has taken place is reduced. An object of the invention is to provide a machine for joggling metal profiles in which the above-mentioned drawbacks are avoided.

A typical machine according to the invention is characterized by the use of two clamp cheeks provided on either side of the place where a profile is to be joggled, each of which clamp cheeks grips the profile through the entire periphery or circumference of the cross-section, said clamp cheeks being moved in relation to each other during the joggling process both in a direction at a right angle to the longitudinal direction of the profile and in the longitudinal direction of the profile. The clamping on all sides ensures that the form of the profile on either side of the joggled place remains unchanged, while, due to the mutual movement of the clamp cheeks during the parallel mutual displacement of the profile sections, by which the joggling itself is stopped, the place that is being treated is at the same time under tensile stress in longitudinal direction, whereby the joggling is facilitated, undesired deformations of the cross-section of the profile, also between the clamp cheeks are avoided and any springing back reaction of the joggled profile is diminished. The machine according to the invention provides joggled metal profiles having a nearly constant inertia moment and no damaged places.

In a preferred embodiment of the machine according to the invention one of the clamp cheeks is carried by a parallelogram guide having at least two parallel hinged rods, executing a swinging movement during the joggling. The parallelogram guide provides in an efficient way a movement component in one direction, at a right angle to the longitudinal direction of the profile, on behalf of the joggling proper, as well as a component in the longitudinal direction of the profile for causing the tensile stress in the place where the joggling takes place, whereby undesired deformation is avoided.

The clamp cheek carried by the parallelogram guide is, during the joggling process, preferably driven by means of a wedge adapted to be slidably displaced, preferably approximately parallel to the longitudinal direction of the profile, said wedge having a preferably adjustable working stroke. The use of a wedge of this kind offers the advantage that the measure of joggling (i.e., the vertical distance between the longitudinal directions, displaced in parallel relation to each other, of two adjacent profile sections) may be readily adjusted by adjusting the working stroke of the wedge. When using a wedge having a small vertical angle, a high value for the ratio of working stroke to rate of joggling can be readily obtained. The use of a wedge offers further the additional advantage that, after the joggling of the profile, the wedge can be retracted without taking the clamp cheeks along. Consequently there is no chance that due to some mistake in the operation the joggling of the profile might be undone.

It is recommended that the wedge engage between a rotatable roll supported by a fixed shaft and a rotatable roll supported by a shaft connected with the clamp cheek to be driven. Due to this construction, wear of the wedge is reduced to a minimum.

With the machine according to the invention each clamp cheek can comprise a supporting ring having a circular bore, in which a conical multipart clamping block is fittingly inserted, which clamping block tightly clamps the profile through the whole circumference of the cross-section. Owing to this construction the clamping blocks can be placed in any desired position with respect to the joggling direction and thus effect jogglings in every direction transversely with respect to the profile. Although this multipart clamping block can be made in any suitable way, it is recommended that use be made of clamping blocks made of a metal having a low melting point, and cast in a conical mould, in which a portion of a profile corresponding to the profile to be joggled is inserted. After solidification the casting can be fittingly separated by saw cuts parallel to the longitudinal direction of the profile. In this way a multipart clamping block is obtained at low cost, which clamping block guarantees an accurate clamping of the profile through the entire circumference of the cross-section.

According to the invention it is possible to support the profile laterally in the place to be joggled by means of extensions of the clamping blocks connected thereto by casting and joining snugly the circumference of the profile, the arrangement being such that the extension of the one clamping block is situated above the profile and the extension of the other clamping block is situated below the profile. This measure is very useful in avoiding the formation of folds in the case of profiles having very thin walls.

The said supporting ring can cooperate with a pressing ring which forces the multipart clamping block into the conical bore of the supporting ring. This ensures that, before the joggling starts, the necessary clamping pressure is applied to the profile. The tensile force generated during the joggling causes, in cooperation with the conical form of the clamping block and the supporting ring, a further increase of this clamping pressure, so that mutual displacement between the profile and the clamping blocks is effectively avoided.

The machine according to the invention can be used for joggling profiles both in cold and in hot condition. In the latter case the heating of the place where the profile is to be joggled can be effected by means of electric current. The electric heating current may be supplied by a transformer dimensioned in such a way that the secondary winding can supply a very high current (some hundreds of amperes) at a very low tension (a few volts). For effecting the electric heating of the profile parts, one or both clamp cheeks can be insulated with respect to the frame of the machine. To this end the conical bore of the supporting ring of one clamp cheek may be provided with an insulating coating for insulating the multipart clamping piece with respect to the frame of the machine.

Under the influence of the electric current the portion of the profile situated between the clamp cheeks is heated. At the ends of this portion relatively much heat passes off through the massive clamping pieces, which have a great heat capacity, so that the temperature at the ends of the portion to be joggled may be considerably lower than in the middle. In order to bring the part to be joggled as much as possible to a uniform temperature, it is recommended that parts of the surface of the multipart clamping blocks engaging the surface of the profile, joining the place of the profile that is to be joggled, be executed in a thermally and electrically insulated way. The result is that the supply of electric current to the profile does not take place as far as the top face of each clamping block but to a place situated deeper in the clamping block, so that a more even temperature of the part of the profile intermediate the clamping blocks is obtained. The thermally and electrically insulating part of the clamping blocks can be obtained by removing a thin layer from said part, e.g. by etching or milling, and by replacing it by a coating of lacquer.

The temperature of the part that is to be joggled in hot condition can be measured with the aid of a slidable feeler, adapted to be pressed against said part during the hot joggling process, to switch off the current automatically when the prescribed temperature is reached, and to initiate the joggling movement.

The invention will now be elucidated with reference to the example shown in the drawing in which:

FIGS. 1a and 1b represent the principle of the machine constructed in accordance with the invention.

FIGS. 2 and 3 respectively show a vertical section and a plan view, partly in section of a machine according to the invention.

In FIGS. 1a and 1b the numeral 1 designated the profile to be joggled through a distance $d$, which profile is U-shaped and has, at the end of its legs, outwardly directed flanges. On either side of the joggled place 2 the profile is tightly clamped by means of clamping blocks 3, 4 which are spaced by a distance $a$ and which clamp the profile along the entire periphery of the cross-section. These clamping blocks are made of a metal alloy having a low melting point in a conical mould, in which coaxially a profile according to the profile to be joggled has been inserted. During the casting process measures can be taken to avoid the adhesion of the casting to the profile inserted therein. After the casting has been removed from the mould, the casting is divided into three parts 3, 3', 4 by saw cuts in the longitudinal direction of the profile.

The thus formed multipart, conical clamping blocks 3, 3', 4 are, thereupon, tightly applied on the profile 1 by means of a supporting ring which will be further discussed below with reference to FIG. 2, whereupon the left hand clamping block is moved by means of a schematically indicated parallelogram guide 5, 5' both in perpendicular direction with respect to the longitudinal direction of the profile and in the longitudinal direction of the profile with respect to the right hand clamping piece with a view to obtaining the joggling $d$. Due to the last-mentioned movement a tensile stress is created during the joggling of the profile, by which the chances that folds may occur in the profile between the clamped parts are diminished and the joggling is facilitated. The presence of a tensile stress reduces at the same time the chances of rebounding of the profile after the joggling is finished.

The machine according to FIGS. 2 and 3 includes a substantially rectangular frame 10. This frame 10 carries the supporting ring 11 of the clamp cheek which is stationary during the joggling, as well as the supporting ring 12 of the clamp cheek that is driven during the joggling process. Each clamp cheek is provided with a pressure ring 13, 14 for pressing the associated clamping block into the conical bore 15, 16 of the supporting rings 11, 12. The pressing of the pressure ring 13 is effected by means of a fork 17, the extremities of which are at 18 hingedly connected with the supporting ring 11, which fork engages the pressing ring 13 by means of the journals 19. The lower part of the fork is at 20 hingedly connected with a hinge rod 21 with hinge point 22, which rod contains a pneumatic cylinder 23. When air is admitted under pressure to the pneumatic cylinder 23 the active length between the hinge points 22 and 20 is increased, so that the pressure ring 13 is pressed against the supporting ring 11.

The supporting ring 11 may be adjusted as a whole in longitudinal direction of the frame 10 by means of rectangular supporting frame 24 comprised in a straight line guide of the frame 10, which supporting frame 24 engages, by means of a nut 25, a screw spindle 26 having a handwheel 27. On turning the handwheel 27 the supporting frame 24, and in consequence thereof also the supporting ring 11, is displaced in longitudinal direction of the frame 10 with a view to the regulation of the distance $a$ between the clamp cheeks.

It may be remarked that the hinge spindle 22 of the rod 21 is supported by the supporting frame 24, so that the action of pressure ring 13 and the rod system associated therewith is independent of the adjustment of the supporting ring 11 with respect to the frame 10.

The clamp cheek 12 is supported by a parallelogram guide, composed of parallel pairs of hinge rods 28, 29 disposed on either side of the supporting ring 12. The fixed spindles of these pairs of hinge rods are supported by two approximately triangular plates 30, connected on either side to the frame 10.

The pressure ring 14 cooperating with the supporting ring 12 is carried by a fork 31 having centers of rotation 32, engaging the supporting ring 12, and journals 33, engaging the pressure ring 14. The fork 31 is, by pin 34, hingedly connected with a hinge rod 35, having a fixed center of rotation 36 and connected to a pneumatic cylinder 37. The driving system of the pressure ring 14 acts in a manner similar to that of the pressure ring 13.

The supporting ring 12 carried by the parallelogram guide 28, 29 is driven by a rotatable roller 38, supported by a shaft 39 and connected with the supporting ring 12. At some distance from the roller 38 a rotatable roller 40 having a fixed shaft 41 supported by the frame 10 is provided. Between these rollers a wedge 42 is driven by means of the pneumatic cylinder 43 with a view to driving the supporting ring 12. When the wedge 42 is displaced to the left, the joggling of the profile is effected. When the wedge 42 is retracted to the right, the supporting ring 12 is not taken along, so that there is no chance that, due to an incorrect movement of the machine, the joggling of the profile is undone. The stroke of the wedge is adjustable by means of a pneumatic micro valve limiting the stroke of the pneumatic cylinder 43 and thus that of the wedge 42. In this way it is possible to adjust the extent of joggling (vertical distance $d$ in FIG. 1a between the longitudinal directions displaced in parallel relation with respect to each other of two adjacent profile sections). It will additionally be noted that cylinder 43 is of greater diameter than cylinder 37 and is thus able to exert greater pressure; therefore, pressure ring 14 will follow movements of cheek 12 when the latter moves against ring 14.

In order to make the machine suitable for the joggling of metal profiles in hot condition, means are provided for heating the zone to be joggled by means of electric current passing therethrough directly. To this end the supporting rings 11 and 12 are provided with insulating coatings 44, 45. In this manner the clamping blocks inserted in said supporting rings are insulated with respect to the frame 10 of the machine. This makes it, however, necessary to insulate at the same time the pressure rings 13, 14 with respect to the frame, which may be effected by the use of journals 19 and 33 which are made of insulating material or coated with such material. The clamping blocks 3, 4 to be inserted in the insulated bores of the supporting rings 11, 12 can be provided with lips connected thereto by casting, in view of the supply of electric current. These lips are connected by means of flexible cables to the secondary winding of a suitable transformer 47 (see FIG. 1a).

The temperature of the profile 1 between the clamp cheeks can be measured by means of a slidable feeler 46 pressed against the profile when the joggling is to be effected in hot condition. The machine may be executed for automatic operation in such a manner that, after a predetermined temperature has been reached, the heating current is automatically switched off, whereupon the pneumatic cylinder 43 is automatically switched in for driving the wedge 42, which driving is checked by the above-mentioned microvalve.

What I claim is:

1. Apparatus for joggling a metal channel comprising clamp cheeks for engaging said channel around the entire periphery thereof and at positions spaced longitudinally along said channel, means supporting said cheeks for relative movement transversely of said channel as well as relative movement in a direction longitudinally of said channel, said means comprising a parallelogram guide including parallel hinge rods connected to one of the cheeks and being adapted for executing a swinging movement, and means for engaging and displacing one of said cheeks relative to the other to effect said movements of the cheeks.

2. Apparatus as claimed in claim 1, wherein the second said means comprises a wedge operatively engaging said one cheek for displacing the same to perform a swinging movement on said rods.

3. Apparatus as claimed in claim 2, comprising a roller rotatable on a fixed axis and engaging said wedge to drive the same and a second rotatable roller sandwiching said wedge with the first said roller, said second roller being coupled to said one cheek.

4. Apparatus as claimed in claim 1, wherein said cheeks comprise guides defining conical recesses and cheek sections constituting channel engaging members adapted to be received in said guides for engaging the channels, said apparatus further comprising pressure rings for controllably urging said sections into said guides.

5. Apparatus as claimed in claim 1 comprising means for heating said cheeks.

References Cited in the file of this patent
UNITED STATES PATENTS

| | | |
|---|---|---|
| 2,477,020 | Van Sant | July 26, 1949 |
| 2,767,763 | Anderson | Oct. 23, 1956 |
| 2,777,048 | Kocks | Jan. 8, 1957 |